(No Model.)
W. R. MERCER.
BICYCLE.
No. 460,784.  Patented Oct. 6, 1891.
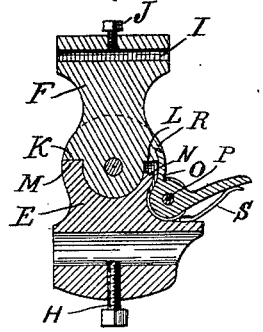
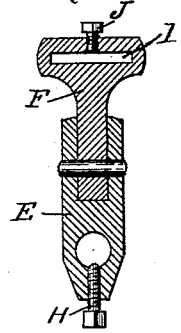
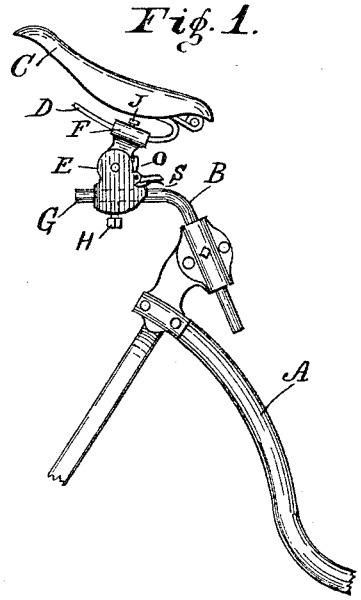
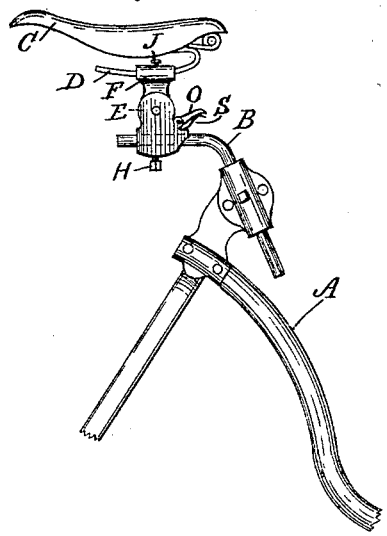
WITNESSES:
V. M. Hood.
Harry Fowler.
INVENTOR
William R. Mercer.
BY H. P. Hood,
ATTORNEY.

UNITED STATES PATENT OFFICE.

WILLIAM R. MERCER, OF TERRE HAUTE, INDIANA.

BICYCLE.

SPECIFICATION forming part of Letters Patent No. 460,784, dated October 6, 1891.

Application filed June 20, 1891. Serial No. 396,908. (No model.)

*To all whom it may concern:*

Be it known that I, WILLIAM R. MERCER, a citizen of the United States, residing at Terre Haute, in the county of Vigo and State of Indiana, have invented a new and useful Improvement in Bicycles, of which the following is a specification.

My invention relates to an improvement in mounting the saddles of bicycles for ladies.

The object of my improvement is to provide means for tipping the saddle forward, so as to facilitate the act of mounting, as hereinafter fully described.

The accompanying drawings illustrate my invention.

Figure 1 represents a side elevation of the saddle of a bicycle and its connections with the frame of the bicycle, the saddle being represented as tipped forward ready for mounting. Fig. 2 is a similar view showing the saddle in its normal position. Fig. 3 represents a vertical section of the coupling which connects the saddle with the frame. Fig. 4 is a transverse section of the same.

In the drawings, A represents the backbone of the bicycle-frame.

B is the saddle-post mounted in the backbone so as to be vertically adjustable in the usual well-known manner.

C is the saddle mounted on a spring D, which is connected with the saddle-post by means of a jointed coupling consisting of two parts E and F. The part E is provided in its lower edge with a cylindrical socket adapted to receive the horizontal arm G of the saddle-post, and is secured thereon by means of the set-screw H, its upper edge being divided to receive the upper section F, which is pivoted to the part E, so as to swing thereon in a vertical plane. The upper part F of the coupling is provided with a mortise or socket I, adapted to receive the flat spring D, which is secured therein by means of the set-screw J. The lower edge of the part F of the saddle-coupling is provided with shoulders K and L, which engage corresponding shoulders M and N in the part E of the coupling, the arrangement being such that when the saddle is in its normal position the shoulders K and M are in contact and limit the backward movement of the saddle, and when the saddle is tipped forward shoulders L and N are in contact and limit the forward movement of the saddle. Shoulders K and M are held normally in contact by means of a dog O, pivoted to the coupling at P and engaging at its upper end a shoulder R on the upper part of the coupling. The upper part of the dog is held normally in engagement with the shoulder R by a spring S.

In operation, previous to mounting the bicycle the dog O is released from engagement with the shoulder R and the part F of the saddle-coupling is rotated upon the part E, thus tipping the saddle forward and depressing its front end in the manner illustrated in Fig. 1. With the saddle in this position the forward end or horn of the saddle is out of the way and does not catch the clothing of the rider when mounting. As soon as the weight of the rider is brought to bear upon the rear part of the saddle the saddle tips backward until the shoulders K and M are in contact and the saddle is in its normal position, as shown in Fig. 2, and dog O is automatically thrown into engagement with the shoulder R by the spring S, thus firmly locking the saddle in position.

I claim as my invention—

In a bicycle, the combination, with the main frame and the saddle, of the coupling consisting of the part E, adapted to be secured to the main frame and provided with the shoulders M and N, the part F, adapted to be secured to the saddle-spring and provided with the shoulders K, L, and R, said parts E and F being pivoted together so as to swing one upon the other in a vertical plane, and the dog O, adapted to engage the shoulder R and to hold the parts in a fixed relation to each other, all arranged to co-operate substantially as and for the purpose set forth.

WILLIAM R. MERCER.

Witnesses:
  H. P. HOOD,
  V. M. HOOD.